(12) United States Patent
Kim et al.

(10) Patent No.: US 8,050,322 B2
(45) Date of Patent: Nov. 1, 2011

(54) BITRATE CONTROL METHOD AND APPARATUS FOR INTRA-ONLY VIDEO SEQUENCE CODING

(75) Inventors: Nak-hoon Kim, Suwon-si (KR);
Byung-cheol Song, Suwon-si (KR);
Yun-gu Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 962 days.

(21) Appl. No.: 12/013,655

(22) Filed: Jan. 14, 2008

(65) Prior Publication Data

US 2008/0304564 A1 Dec. 11, 2008

(30) Foreign Application Priority Data

Jun. 11, 2007 (KR) .................. 10-2007-0056761

(51) Int. Cl.
*H04N 11/02* (2006.01)
(52) U.S. Cl. .............. 375/240.13; 375/240; 375/240.01; 375/240.24; 375/240.26; 348/699; 348/700
(58) Field of Classification Search .................. 375/240, 375/240.01, 240.03, 240.13, 240.24, 240.26; 348/699, 700
See application file for complete search history.

(56) References Cited

U.S. PATENT DOCUMENTS

| 5,751,360 | A | * | 5/1998 | Tanaka | 375/240.15 |
| 6,072,831 | A | * | 6/2000 | Chen | 375/240.03 |
| 6,141,448 | A | * | 10/2000 | Khansari et al. | 382/236 |
| 2002/0090207 | A1 | * | 7/2002 | Mishima et al. | 386/111 |
| 2002/0159523 | A1 | * | 10/2002 | Wang et al. | 375/240.05 |
| 2002/0168012 | A1 | * | 11/2002 | Ramaswamy | 375/240.29 |
| 2006/0209954 | A1 | * | 9/2006 | Wang et al. | 375/240.12 |
| 2008/0112483 | A1 | * | 5/2008 | Lu et al. | 375/240.03 |
| 2008/0137732 | A1 | * | 6/2008 | Sekiguchi et al. | 375/240.01 |
| 2008/0232472 | A1 | * | 9/2008 | Kwon | 375/240.13 |
| 2009/0016631 | A1 | * | 1/2009 | Naito et al. | 382/251 |
| 2009/0052537 | A1 | * | 2/2009 | Burazerovic et al. | 375/240.15 |
| 2009/0168894 | A1 | * | 7/2009 | Marpe et al. | 375/240.24 |

FOREIGN PATENT DOCUMENTS

| EP | 1005233 A1 | 10/1998 |
| WO | 99/63760 | 12/1999 |
| WO | 2006/060037 A1 | 6/2006 |

OTHER PUBLICATIONS

Sullivan et al. "Joint Model Reference Encoding Methods and Decoding Concealment Methods" Joint Video Team (JVT) of ISO/IEC MPEG and ITU-T VCEG, Sep. 2003, pp. 1-35, San Diego, CA.
Keesman et al. "Bit-Rate Control for MPEG Encoders." Image Communication. Elsevier Science Publishers, Feb. 1995, pp. 545-560, vol. 6, No. 6.

* cited by examiner

*Primary Examiner* — Kwang B Yao
*Assistant Examiner* — Nguyen Ngo
(74) *Attorney, Agent, or Firm* — Sughrue Mion, PLLC

(57) ABSTRACT

A bitrate control method and apparatus for video sequence coding by using only intra pictures are provided. The rate control method includes: separating a video sequence formed only with intra pictures, into picture group units, slice units, and macroblock units; and performing bitrate control so that a predetermined amount of bits can be generated when encoding is performed. According to the method and apparatus, overflow and underflow of a buffer can be prevented.

18 Claims, 6 Drawing Sheets

BITRATE CONTROL METHOD AND APPARATUS FOR INTRA-ONLY VIDEO SEQUENCE CODING

CROSS-REFERENCE TO RELATED PATENT APPLICATIONS

This application claims priority from Korean Patent Application No. 10-2007-0056761, filed on Jun. 11, 2007, in the Korean Intellectual Property Office, the disclosure of which is incorporated herein in its entirety by reference.

BACKGROUND OF THE INVENTION

Methods and apparatuses consistent with the the present invention relate to controlling of a bitrate, and more particularly, to bitrate control for video sequence coding by using only intra pictures.

DESCRIPTION OF THE RELATED ART

In an H.264 high 4:4:4 profile whose standardization is underway in a joint video team (JVT), a high 4:4:4 intra-only profile is separately defined, thereby stipulating a method of encoding all pictures in a video sequence with intra pictures. The intra-only coding can be applied to application fields that require high-resolution and high-quality images equal to or higher than a high definition (HD) level, such as medical applications, image editing systems, and specific camcorders. A real-time video transmission system requiring a low delay and low latency is also one of the application fields of the intra-only coding.

Bitrate control (rate control) is very significant in a real-time video transmission system. Since a real-time video transmission system requires a low delay and low latency, generation of a bitstream having a fixed rate is necessary and it is difficult to apply inter-coding which requires at least a delay of one frame. Since the fixed bitrate condition cannot be satisfied by only adjusting an encoding parameter of a video sequence, a buffer for temporarily storing a bitstream in order to generate a fixed bitrate should be prepared so that the bitrate can be adjusted. In order to satisfy the low latency condition, the size of the buffer for storing a bitstream should be limited. Accordingly, the probability that an underflow and overflow of the buffer can occur increases.

According to a related art bitrate control method, if an overflow occurs, a quantization parameter is increased or macroblock or frame units are skipped, thereby adjusting the bitrate. If an underflow occurs, a quantization parameter is decreased or a null packet is inserted in a buffer control unit, thereby adjusting the bitrate. Accordingly, if an overflow occurs, the quality of an image is degraded, and if an underflow occurs, the capacity of channels is wasted. In particular, in intra-only coding, it is impossible to skip macroblock or frame units, and the overflow can be solved by adjusting only a quantization parameter.

Most related art fixed bitrate control methods are performed by assuming that a video sequence is formed with intra pictures and inter pictures.

According to a related art fixed bitrate control method, if a target bitrate is set in units of sequences, a target bit amount is allocated for each group of pictures (GOP) unit. Here, the GOP means a picture set formed with one intra picture (I picture) and a plurality of inter pictures (Predicted) pictures or B(i-predictive) pictures.

FIG. 1 is a diagram illustrating an example of a related art GOP 10. Referring to FIG. 1, the GOP 10 includes one I picture I0, two P pictures P3 and P6, and six B pictures B1, B2, B4, B5, B7 and B8. A predetermined amount of bits allocated to GOP unit are distributed to individual pictures inside the GOP 10 by considering the type of a picture and complexity of a picture. By considering a target bit amount allocated for each picture of the I picture I0, two P pictures P3 and P6, and six B pictures B1, B2, B4, B5, B7 and B8, an actually occurring bit amount, and buffer fullness, a final quantization parameter for each macroblock unit is determined, thereby performing bitrate control.

However, since the related art fixed bitrate control method assumes that P pictures and B pictures as well as I pictures exist in a GOP, it is difficult to apply the related art fixed bitrate control method to intra-only coding. In addition, it is difficult for the reated art fixed bitrate control method to generate a bitrate having a fixed bitrate for each macroblock unit, and therefore it is highly probable that an overflow or underflow occurs.

SUMMARY OF THE INVENTION

The present invention provides a bitrate control method and apparatus by which, when a video sequence is encoded by using only intra pictures, a bitstream having a fixed bitrate is generated, thus preventing an overflow and underflow of a bitstream buffer.

According to an aspect of the present invention, there is provided a method of controlling a bitrate when a video sequence formed only with intra pictures is encoded, the method including: dividing the intra pictures into predetermined picture groups, and determining a target bit amount of each picture group; dividing intra pictures included in each of the picture groups into slices, and determining a target bit amount of each slice based on the target bit amount of a picture group to which the slice belongs; determining a target bit amount of a macroblock included in the slice based on the target bit amount of the slice; and calculating a quantization parameter of a current macroblock to be encoded, by considering the determined target bit amount of the macroblock, a bit amount of the macroblock generated to the previous macroblock, and buffer fullness.

The dividing of the intra pictures into the predetermined picture groups may include, if the intra pictures are common mode intra pictures in which each intra picture comprises an image of a plurality of color components, dividing the intra pictures so that each picture group can comprise an identical number of intra pictures.

The dividing of the intra pictures into the predetermined picture groups may further include, if the intra pictures are common mode intra pictures in which each intra picture comprises an image of a plurality of color components, dividing the intra pictures with reference to an intra picture in which a scene changes.

The dividing of the intra pictures into the predetermined picture groups may further include, if the intra pictures are independent mode intra pictures in which each intra picture comprises an image of only one color component among a plurality of color components, dividing the intra pictures so that the number of intra pictures having one color component image is the same as the number of intra pictures having any other color component image in one picture group.

The dividing of the intra pictures into the predetermined picture groups may further include, if the intra pictures are independent mode intra pictures in which each intra picture comprises an image of only one color component among a plurality of color components, dividing the intra pictures so that one picture group comprises intra pictures of images of only one color component selected from the plurality of color component images.

The determining of the target bit amount of each picture group may include determining a target bit amount RGOP(i) of an i-th picture group to which a macroblock being currently encoded belongs using the following equation:

$$R_{GOP}(i) = R_{GOP}(i-1) + k * \frac{\text{bit\_rate}}{\text{picture\_rate}}$$

where $R_{GOP}(i)$ is the target bit amount of the i-th picture group ($i \geq 0$) to which the macroblock being currently encoded belongs, $R_{GOP}(i-1)$ is a target bit amount allocated to an (i−1)-th picture group previous to the current i-th picture group, $R_{GOP}(-1)=0$, k is the total number of intra pictures included in the i-th picture group, bit_rate is the amount of bits which are generated per second, and picture_rate is the number of intra pictures which are generated per second.

The determining of the target bit amount of each slice may further include, determining the bit amount allocated to a current slice using the following equation:

$$T_{slice}(i, j) = \max\left(T_{slice}^{min}, \frac{R_{GOP}(i, j)}{N_{Slice}(i, j)}\right)$$

where $R_{GOP}(i,j)$ is the amount of bits that can be used from among the bit amount allocated to the i-th picture group at a time when the j-th slice is encoded, $N_{Slice}(i,j)$ is the number of slices that are not encoded in the picture group when the j-th slice of the i-th picture group is encoded, $T_{Slice}^{min}$ is a minimum value of a bit amount that should be allocated to a slice, and $T_{slice}(i,j)$ is the amount of bits allocated to the current slice corresponding to a j-th slice of an i-th picture group.

The determining of the target bit amount of the macroblock may include determining the target bit amount of the current macroblock using the following equation:

$$T_{MB}(i, j) = \frac{T_{Slice}(i, j)}{n_{Slice}}$$

where $T_{MB}(i,j)$ is the target bit amount for the current macroblock at a j-th slice of an i-th picture group, and $n_{Slice}$ is the number of macroblocks included in the slice.

The determining of the quantization parameter of the current macroblock may include:

calculating the quantization parameter for encoding the current macroblock, by considering buffer fullness, the target bit amount for a macroblock unit, and the bit amount generated to the previous macroblock;

comparing the buffer fullness with a predetermined reference value, and according to the magnitude of the buffer fullness, determining whether or not an overflow or underflow of the buffer occurs, and generating a calibration value for calibrating the quantization parameter; and by adding the calibration value to the calculated quantization parameter, calculating a calibrated quantization parameter.

According to another aspect of the present invention, there is provided an apparatus for controlling a bitrate when a video sequence formed only with intra pictures is encoded, the apparatus including: a buffer temporarily storing an encoded bitstream; a target bit amount determination unit for picture group units dividing the intra pictures into predetermined picture groups, and determining a target bit amount of each picture group; a target bit amount determination unit for slice units dividing intra pictures included in each of the picture groups into slices, and determining a target bit amount of each slice based on the target bit amount of a picture group to which the slice belongs; a target bit amount determination unit for macroblock units determining a target bit amount of a macroblock included in the slice based on the target bit amount of the slice; a bitrate adjustment unit determining a quantization parameter for encoding a current macroblock, by considering the buffer fullness, the determined target bit amount for a macroblock unit, and a bit amount generated to the previous macroblock, and by comparing the magnitude of the buffer fullness with a predetermined reference value at a time when the current macroblock is encoded, generating a calibration value according to the buffer fullness, and by adding the generated calibration value to the quantization parameter, generating and outputting a calibrated quantization parameter; and an encoding unit quantizing the current macroblock based on the calibrated quantization parameter and generating a bitstream.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
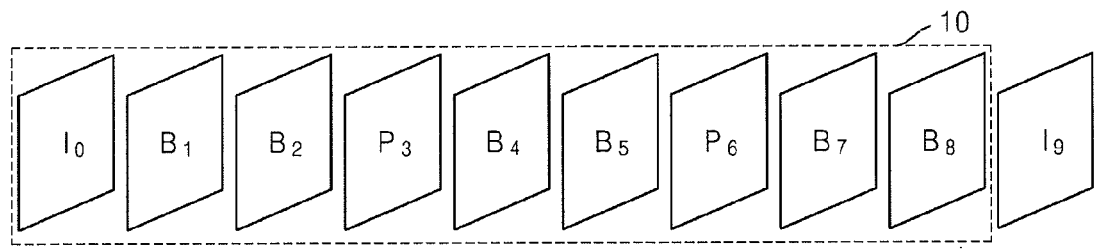
FIG. 1 is a diagram illustrating an example of a related art GOP.
Figure 2:
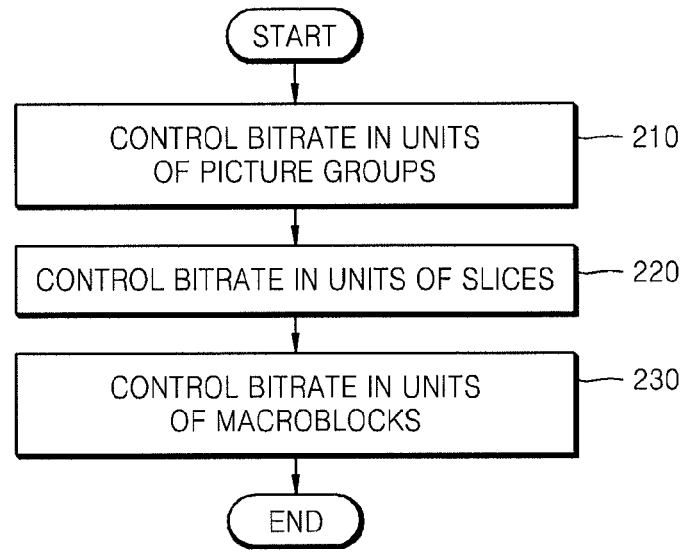
FIG. 2 is a simplified flowchart illustrating a method of controlling a bitrate, according to an exemplary embodiment of the present invention.

FIG. 2 is a simplified flowchart illustrating a method of controlling a bitrate, according to an exemplary embodiment of the present invention.

The bitrate control method according to an exemplary embodiment of the present invention has a hierarchical structure for performing bitrate control in units of groups of pictures (GOPs) (hereinafter referred to as a "picture group"), bitrate control in units of slices, and bitrate control in units of macroblocks when a video sequence formed only with intra pictures is encoded.

Referring to FIG. 2, in operation 210, an input video sequence formed only with intra pictures is divided into picture groups, and a target bit amount to be allocated to each picture group is set, thereby performing bitrate control for each picture group unit. In particular, an exemplary embodiment of the present invention suggests a method of generating a picture group with respect to the type of intra pictures in order to control the bitrate of an input video sequence formed only with intra pictures. The method of dividing the video sequence formed only with intra pictures into picture groups will be explained later.

In operation 220, the intra pictures included in the picture groups obtained through the division are divided into slice units. Then, based on the target bit amount of a picture group to which a current slice belongs, and the total number of slices in the picture group, a target bit amount is allocated to each slice unit. If encoding of all macroblocks included in the current slice is completed, the values of variables related to bitrate control are updated in order to encode a next slice, thereby performing bitrate control for each slice unit.

In operation 230, a target bit amount is allocated to each macroblock included in a slice, and a quantization parameter of a current macroblock is calculated by considering the allocated target bit amount of the macroblock, the bit amount occurring up to the previous macroblock, and buffer fullness. Meanwhile, according to the state of a buffer at a time when the current macroblock is encoded, a quantization parameter is calibrated, thereby determining a calibrated quantization parameter. According to the calibrated quantization parameter, the current macroblock is encoded, thereby performing bitrate control for each macroblock unit.

Figure 3:
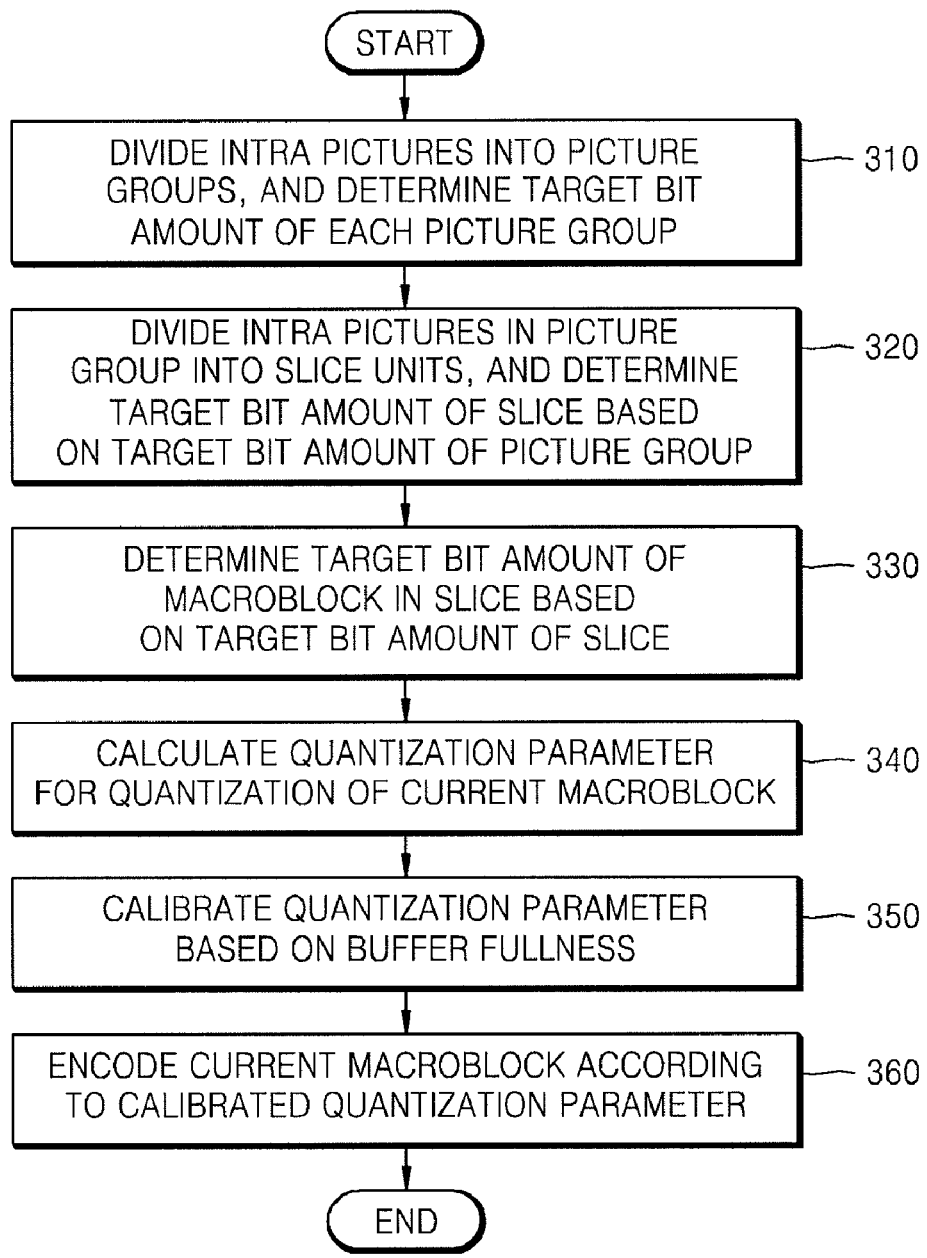
FIG. 3 is a detailed flowchart illustrating a method of controlling a bitrate according to an exemplary embodiment of the present invention.

FIG. 3 is a detailed flowchart illustrating a method of controlling a bitrate, according to an exemplary embodiment of the present invention.

Referring to FIG. 3, in operation 310, intra pictures included in an input video sequence are divided into picture groups, and a target bit amount for each picture group is determined.

According to the related art technology, when a video sequence including a plurality of inter pictures, that is, P pictures and B pictures, is divided into picture groups, the video sequence is divided with reference to an intra (I) picture, thereby generating picture groups. For example, when a video sequence such as IBBPBBPIBBPBBP . . . is input, the video sequence is divided with reference to I pictures, and each picture group is generated as {IBBPBBP}. However, when a video sequence formed only with intra pictures is divided into picture groups, the picture groups cannot be generated with reference to I pictures according to the related art technology, because all pictures in the video sequence are intra pictures. Therefore, according to an intra-only video coding mode, i.e., a common mode or an independent mode, an exemplary embodiment of the present invention divides intra pictures into picture groups as follows.

Figure 4A:
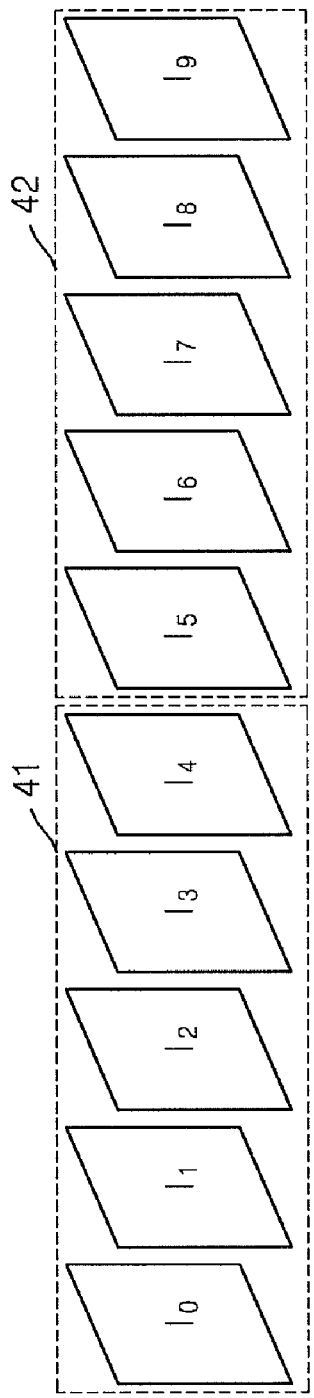
FIGS. 4A and 4B are diagrams for explaining a method of dividing intra pictures into picture groups when encoding is performed in a common mode according to an exemplary embodiment of the present invention.
Figure 4B:
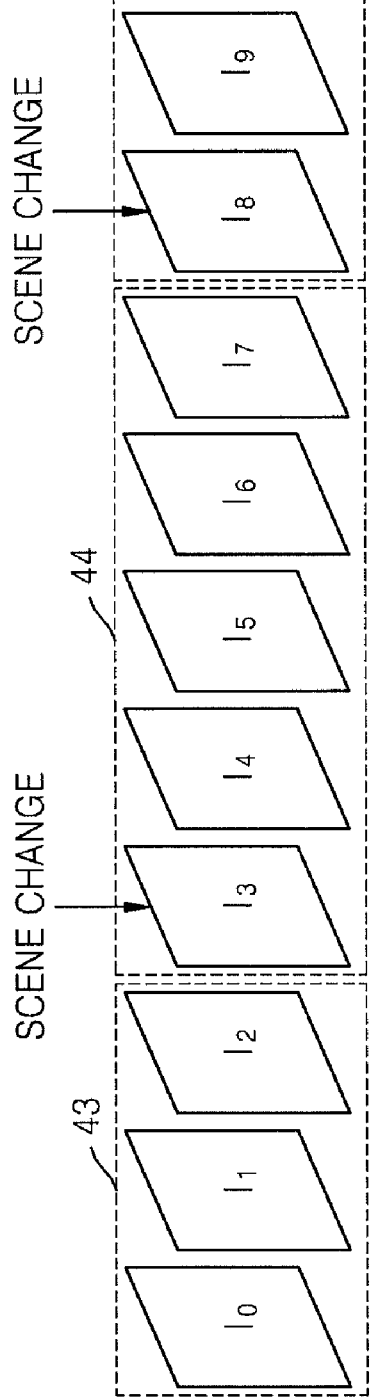

FIGS. 4A and 4B are diagrams for explaining a method of dividing intra pictures into picture groups when encoding is performed in a common mode, according to an exemplary embodiment of the present invention. An intra picture to be encoded using common mode coding (hereinafter referred to as a "common mode intra picture") refers to an intra picture including all color components of an image. For example, when an image has three color components such as R, G, and B color components, one pixel of the intra picture has all three color component values of R, G, and B.

Referring to FIG. 4A, intra pictures can be divided so that picture groups 41 and 42 can have an identical predetermined number of intra pictures. FIG. 4A illustrates a case where each picture group 41 and 42 has five intra pictures. The number of intra pictures included in each picture group 41 and 42 can be made so that the number of the intra pictures can be maintained for a predetermined time, and then, according to a change in the characteristic of the pictures, the number can be changed. For example, picture groups may be generated so that each picture group to an arbitrary n-th (n is a positive integer) picture group, can have k intra pictures (k is a positive integer), and from the (n+1)-th picture group, each picture group can have m intra pictures (m is a positive integer, m≠k).

Also, an intra picture in which a scene change occurs is detected from input intra pictures among common mode intra pictures, and the intra pictures may be divided with reference to the detected scene change intra picture, thereby generating picture groups. Referring to FIG. 4B, if scene changes occur in pictures I3 and I8, picture groups may be generated with reference to the pictures I3 and I8 in which scene changes occur. As illustrated in FIG. 4B, when picture groups are generated with reference to intra pictures in which scene changes occur, the number of intra pictures belonging to each picture group may vary.

Figure 5A:
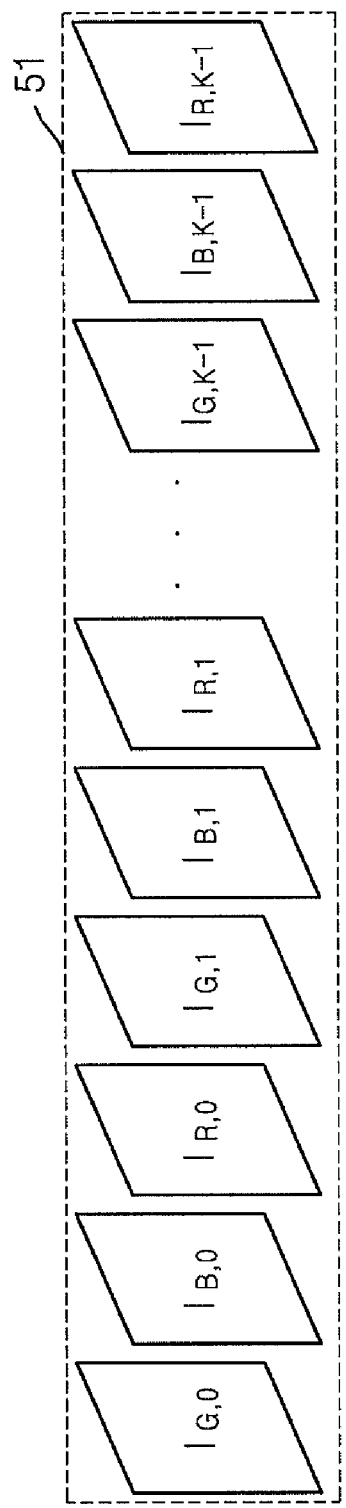
FIGS. 5A and 5B are diagrams for explaining a method of generating picture groups when encoding is performed in an independent mode, according to an exemplary embodiment of the present invention.
Figure 5B:
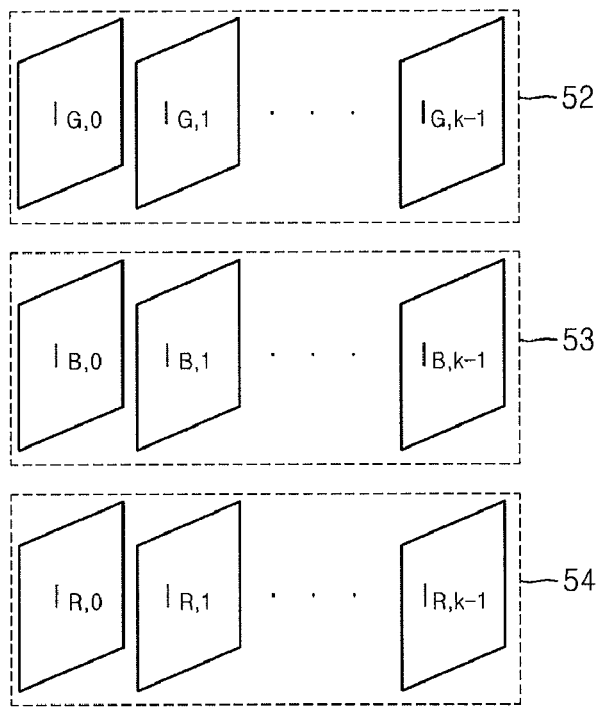

FIGS. 5A and 5B are diagrams for explaining a method of generating picture groups when encoding is performed in an independent mode, according to an exemplary embodiment of the present invention. Referring to FIGS. 5A and 5B, $I_{G,t}$ indicates an intra picture which is formed by only G color component pixels at an arbitrary time t, $I_{B,t}$ indicates an intra picture which is formed by only B color component pixels at an arbitrary time t, and $I_{R,t}$ indicates an intra picture which is formed by only R color component pixels at an arbitrary time t.

An intra picture to be encoded using independent mode coding (hereinafter referred to as an "independent mode intra picture") refers to an intra picture including pixels of only one color component. That is, an independent mode intra picture corresponds to a case where each color component image forms one independent intra picture. An independent mode intra picture can be applied to an image of an arbitrary color space signal having three arbitrary color components, but for convenience of explanation, a case where one intra picture has only one color component among R, G, and B color components will be mainly explained. In this case, a picture group can be defined as a set of pictures, including $K_G$ $I_G$ pictures, $K_B$ $I_B$ pictures, and $K_R$ $I_R$ pictures. Here, $I_G$, $I_B$, and $I_R$ indicate intra pictures formed with G color component pixels, B color component pixels, and R color component pixels, respectively. Each of the variables $K_G$, $K_B$, and $K_R$ represents a number of respective color component pictures and is an integer equal to or greater than 0, and should always satisfy the equation $K_G+K_B+K_R \neq 0$. That is, in one picture group, an intra picture of at least one color component should be included.

FIG. 5A illustrates a case where the number of intra pictures having one color component is the same as the number of intra pictures having any other color component in one picture group 51. That is, in the one picture group 51 illustrated in FIG. 5A, k independent mode intra pictures formed only with each color component of R, G, and B are included. FIG. 5B illustrates a case where picture groups are generated so that intra pictures having only one color component can be included in picture groups 52, 53 and 54, respectively.

When the texture information or complexity is similar in each color component image, it is advantageous to allow each picture group to include the same numbers of intra pictures having different color component images. However, when the complexity of a predetermined color component image is high or a noise level is high, it is more efficient in the aspect of bitrate control to independently encode each color component image as illustrated in FIG. 5B.

As described above, if picture groups are generated by dividing intra pictures forming a current input video sequence into picture groups according to the mode of the intra pictures, a target bit amount that is a bit amount to be allocated to each picture group can be calculated. In the case of a common mode intra picture, a target bit amount ($R_{GOP}(i)$) allocated to an arbitrary i-th picture group ($i \geq 0$) can be calculated using Equation 1 as follows:

$$R_{GOP}(i) = R_{GOP}(i-1) + k * \frac{\text{bit\_rate}}{\text{picture\_rate}} \quad \text{(Equation 1)}$$

Here, $R_{GOP}(i-1)$ indicates a target bit amount allocated to an (i−1)-th picture group previous to a current i-th picture group, assuming that $R_{GOP}(-1)=0$, k is the total number of intra pictures included in the i-th picture group, bit_rate is the amount of bits which are generated per second, and picture_rate is the number of intra pictures which are generated per second.

In the case of an independent mode intra picture, a target bit amount ($R_{GOP}(i)$) allocated to an arbitrary i-th picture group ($i \geq 0$) can be calculated using Equation 2 as follows:

$$R_{GOP}(i) = R_{GOP}(i-1) + (k_G + k_B + k_R) * \frac{\text{bit\_rate}}{\text{picture\_rate}} \quad \text{(Equation 2)}$$

Referring again to FIG. 3, in operation 320, intra pictures included in a picture group are divided into slice units, and based on the target bit amount of the picture group, a target bit amount of a slice included in the picture group is determined.

According to the related art bitrate control method, the bitrate for each picture group is controlled, bitrate controls is performed again by allocating a target bit amount to each picture unit, and bitrate control is again performed in units of macroblocks. However, according to the bitrate control method of an exemplary embodiment of the present invention, bitrate control is performed in units of picture groups, and then, bitrate control is performed not in units of pictures, but in units of slices. When bitrate control is performed in units of pictures in relation to an image having a huge amount of data such as an HD level image according to the related art technology, a bit amount greater than a target bit amount is consumed in the first half of a picture, and this causes a shortage in the bit amount that can be used in the second half of the picture. Accordingly, a bit amount less than the target bit amount is allocated and the picture quality is degraded. Also, if a small amount of bits are consumed in the first half of the picture, too many bits are allocated to the image data of the second half of the picture in order to adjust the bitrate in the second half of the picture, and thus the bandwidth cannot be used efficiently. In other words, since it is difficult to uniformly maintain picture quality and the amount of generated bits according to the related art technology, even when a bit amount is allocated for each picture unit, a problem may occur unless a target bit amount is appropriately adjusted in a unit that is less than a picture unit. Accordingly, when an image including much data such as a high-resolution image is encoded, a target bit amount may be allocated to a unit that is less than the picture unit. According to an exemplary embodiment of the present invention, if a target bit amount is allocated in units of picture groups, a target bit amount is allocated to each of a plurality of slice units included in each intra picture of each picture group, and as a result, a uniform amount of bits are allocated also to each picture unit. A slice is one of a plurality of reference units with which bitrate control is performed according to an exemplary embodiment of the present invention. In the case of a common mode intra picture image, a slice is defined as a macroblock group formed by neighboring $n_{slice}$ macroblocks. Here, $n_{slice}$ should satisfy Equation 3 as follows:

$$1 \leq n_{slice} \leq n_{pic} \text{ and } (n_{pic} \mod n_{slice}) = 0 \quad \text{(Equation 3)}$$

Figure 6:
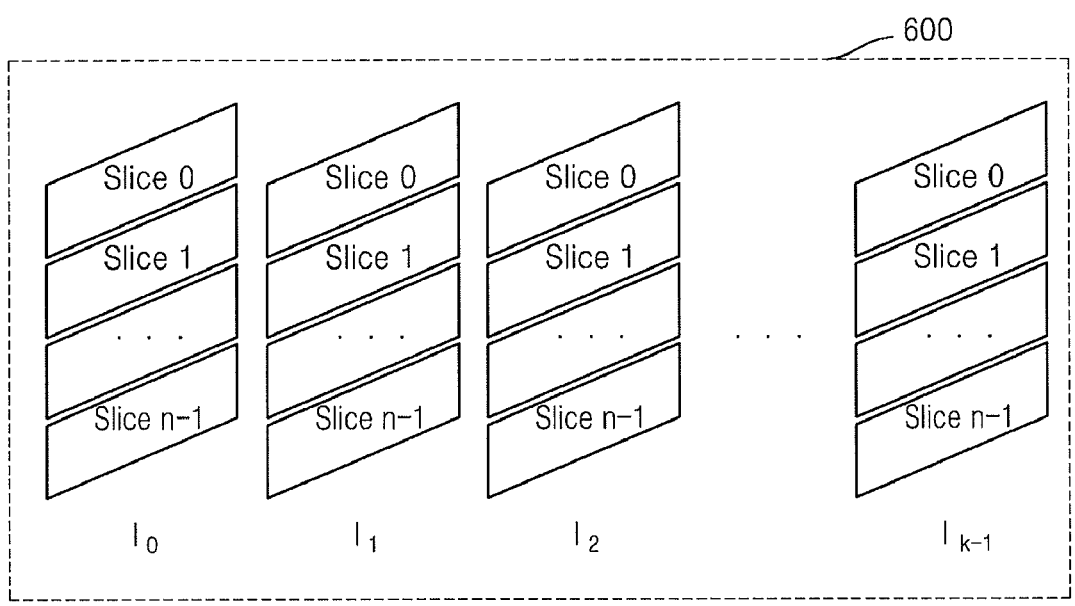
FIG. 6 is a diagram illustrating a case where k common mode intra pictures included in one picture group are divided into slices, according to an exemplary embodiment of the present invention.

Here, $n_{pic}$ is the total number of macroblocks included in one intra picture, and mod indicates a modular operation. A slice may be formed by only one macroblock, and a whole picture may be formed by only one slice. For example, FIG. 6 illustrates a case where each of k common mode intra pictures included in one picture group 600 is divided into n slices according to an exemplary embodiment of the present invention.

When independent mode intra pictures are divided into slice units, one slice may be formed only with macroblocks existing in intra pictures of an identical color component, or one slice may be formed with a predetermined number of macroblocks existing at identical positions in intra pictures of different color components. For example, in RGB coding, each of intra pictures of a G color component, intra pictures of an R color component, and intra pictures of a B color component may be divided into slice units. Also, a predetermined number of macroblocks in the G color component intra pictures, and the predetermined number of macroblocks at the same locations in the R color component intra pictures and B color component intra pictures may be grouped together and defined as one slice.

A target bit amount of a slice can be calculated using Equation 4 as follows:

$$T_{slice}(i,j) = \max\left(T_{slice}^{min}, \frac{R_{GOP}(i,j)}{N_{Slice}(i,j)}\right) \quad \text{(Equation 4)}$$

Here, $T_{slice}(i,j)$ is the amount of bits allocated to a j-th slice of an i-th picture group, $R_{GOP}(i,j)$ is the amount of bits that can be used from among the bit amount allocated to the i-th picture group at a time when the j-th slice is encoded, and $N_{Slice}(i,j)$ is the number of slices that are not encoded in the picture group when the j-th slice of the i-th picture group is encoded. For example, when an i-th picture group is formed with k intra pictures, and each intra picture is divided into n slices, $N_{Slice}(i,j)=kn-1$. $T_{Slice}^{min}$ is a minimum value of a bit amount that should be allocated to a slice, and can be calculated using Equation 5 as follows:

$$T_{Slice}^{min} = \frac{\text{bit\_rate}}{8 * \text{picture\_rate} * \frac{n_{pic}}{n_{Slice}}} \quad \text{(Equation 5)}$$

Equation 5 assumes an 8-bit image, and for an n-bit image, 8 can be substituted for n in Equation 5.

Referring again to FIG. 3, if the target bit amount of a slice is determined by using Equation 4 in operation 320, a target bit amount of a macroblock included in the slice is determined based on the target bit amount of the slice in operation 330. Assuming that the target bit amount for a macroblock unit at a j-th slice of an i-th picture group is $T_{MB}(i,j)$, $T_{MB}(i,j)$ can be calculated according to Equation 6 as follows:

$$T_{MB}(i,j) = \frac{T_{Slice}(i,j)}{n_{Slice}} \quad \text{(Equation 6)}$$

That is, the target bit amount of a macroblock included in a slice can be obtained by dividing the target bit amount allocated to the slice by the number of macroblocks included in the slice.

Meanwhile, if encoding of all macroblocks included in one slice is completed, variable values related to bitrate control need to be updated in order to encode a next slice. For example, if encoding of a j-th slice of an i-th picture group is completed, in order to encode the next slice, i.e., the (j+1)-th slice, each of $R_{GOP}(i,j+1)$ indicating the bit amount that can be used at a time when bits are allocated to the (j+1)-th slice of the i-th picture group, $d_{Slice}(i,j+1)$ indicating the amount of a buffer required for encoding the (j+1)-th slice of the i-th picture group, and $N_{Slice}(i,j+1)$ indicating the number of slices that are not encoded among slices of the i-th picture group when the (j+1)-th slice of the i-th picture group is encoded is updated by using Equation 7 as follows:

$$R_{GOP}(i,j+1) = R_{GOP}(i,j) - B_{Slice}(i,j)$$

$$d_{Slice}(i,j+1) = d_{Slice}(i,j) + B_{Slice}(i,j) - T_{Slice}(i,j)$$

$$N_{Slice}(i,j+1) = N_{Slice}(i,j) - 1 \quad \text{(Equation 7)}$$

Here, $B_{Slice}(i,j)$ indicates the actual bit amount used for encoding the j-th slice of the i-th picture group.

In operation 340, a quantization parameter for quantization of a current macroblock is determined. More specifically, by considering buffer fullness, the target bit amount of a macroblock unit, and the bit amount allocated to the previous macroblock, the quantization parameter for encoding each macroblock can be calculated. By applying a variety of algorithms, the quantization parameter can be calculated. For example, when a quantization parameter determination algorithm known as a test model 5 (TM5) is applied, the quantization parameter ($QP_k$) applied to a k-th macroblock in a j-th slice of an i-th picture group can be calculated using Equation 8 as follows:

$$QP_k = \frac{(d_0 + d_{MB}(i,j,k-1)) * 31 * \text{picture\_rate} * N_{act_k}}{2 * \text{bit\_rate}} \quad \text{(Equation 8)}$$

Here, $d_0$ is buffer fullness when the first macroblock of a slice to which a current macroblock belongs is encoded, and is the same as $d_{Slice}(i,j)$. $N\_{act_k}$ is a normalized activity of a k-th macroblock, and $B_{MB}(i,j,k)$ is an actual bit amount generated during a period from a time when encoding of the j-th slice of the i-th picture group begins, to a time when encoding of the k-th macroblock is completed. In Equation 8, $d_{MB}(i,j,k)$ indicates buffer fullness at a time when the k-th macroblock of the j-th slice of the i-th picture group is encoded, and is calculated using Equation 9 as follows:

$$d_{MB}(i,j,k) = k * T_{MB}(i,j) - B_{MB}(i,k) \quad \text{(Equation 9)}$$

In operation 350, in order to prevent an overflow or underflow of a buffer, and induce a predetermined amount of bits to occur in units of macroblocks, an overflow or underflow of the buffer is determined in relation to each macroblock unit, and then, the quantization parameter of the macroblock calculated using Equation 8 is calibrated.

That is, according to an exemplary embodiment of the present invention, by comparing the buffer fullness value measured after encoding to the previous macroblock, with predetermined reference values, a calibration value of the quantization parameter of a current macroblock is determined according to the buffer fullness value. By using the determined calibration value, the calculated quantization parameter is calibrated, thereby determining a calibrated quantization parameter.

For example, as illustrated in Table 1 below, by comparing $d_{MB}(i,j,k-1)$ indicating the buffer fullness measured after encoding to the previous macroblock, with predetermined reference values ($L_{O2}, L_{O1}, L_{U1}, L_{U2}$) at a time when a k-th macroblock is encoded, the state of a buffer is determined, thereby determining a calibration value of a quantization parameter.

TABLE 1

| Condition | Buffer state | Quantization parameter calibration value ($\Delta MB$) |
| --- | --- | --- |
| $d_{MB}(i,j,k-1) \geq L_{O2}$ | Overflow 2 | $\Delta_2$ |
| $L_{O1} \leq d_{MB}(i,j,k-1) \leq L_{O2}$ | Overflow 1 | $\Delta_1$ |
| $L_{U1} \leq d_{MB}(i,j,k-1) \leq L_{O1}$ | Normal | 0 |
| $L_{U2} \leq d_{MB}(i,j,k-1) \leq L_{U1}$ | Underflow 1 | $-\Delta_1$ |
| $d_{MB}(i,j,k-1) \leq L_{U2}$ | Underflow 2 | $-\Delta_2$ |

Here, $L_{U1}$ and $L_{U2}$ are reference values for determining an underflow of the buffer, and $L_{O1}$ and $L_{O2}$ are reference values for determining an overflow of the buffer. The reference values ($L_{O2}, L_{O1}, L_{U1}$ and $L_{U2}$) can be determined in proportion to the size of the buffer, and it is assumed that $L_{O2} \geq L_{O1} \geq L_{U1} \geq L_{U2}$. In the above example, the overflow and underflow of the buffer are determined by using four reference values, but by increasing the number of reference values, more detailed calibration of the quantization parameter may also be enabled.

Each of $\Delta_2$ and $\Delta_1$ is an arbitrary positive integer and should satisfy $(QP_{MAX} - QP_{MIN}) \geq \Delta_2 \geq \Delta_1$. $QP_{MAX}$ is a maximum value that a quantization parameter can be, and $QP_{MIN}$ is a minimum value that a quantization parameter can be. In general, in the moving picture compression standards based on MPEG-1, 2, and 4, $QP_{MAX} = 31$, and $QP_{MIN} = 1$, and in the H.264/AVC compression standard, $QP_{MAX} = 51$, and $QP_{MIN} = 0$.

If the quantization parameter calibration value ($\Delta_{MB}$) is determined by considering the buffer fullness at a time when the current macroblock is encoded, i.e., the buffer fullness measured after encoding to the previous macroblock is completed, a calibrated quantization parameter ($QP_k'$) is determined by adding the calibration value ($\Delta_{MB}$) to the quantization parameter ($QP_k$) using Equation 10 as follows:

$$QP_k' = \min(QP_{max}, \max(QP_{min}, QP_k + \Delta_{MB})) \quad \text{(Equation 10)}$$

Referring to Equation 10, when the buffer is in an overflow state, the calibration value ($\Delta_{MB}$) becomes a positive number, and the current macroblock is encoded by using a larger quantization parameter, thereby reducing the amount of occurring bits. When the buffer is in an underflow state, the calibration value ($\Delta_{MB}$) becomes a negative number, and the current macroblock is encoded by using a larger quantization parameter, thereby increasing the amount of occurring bits.

Figure 7:
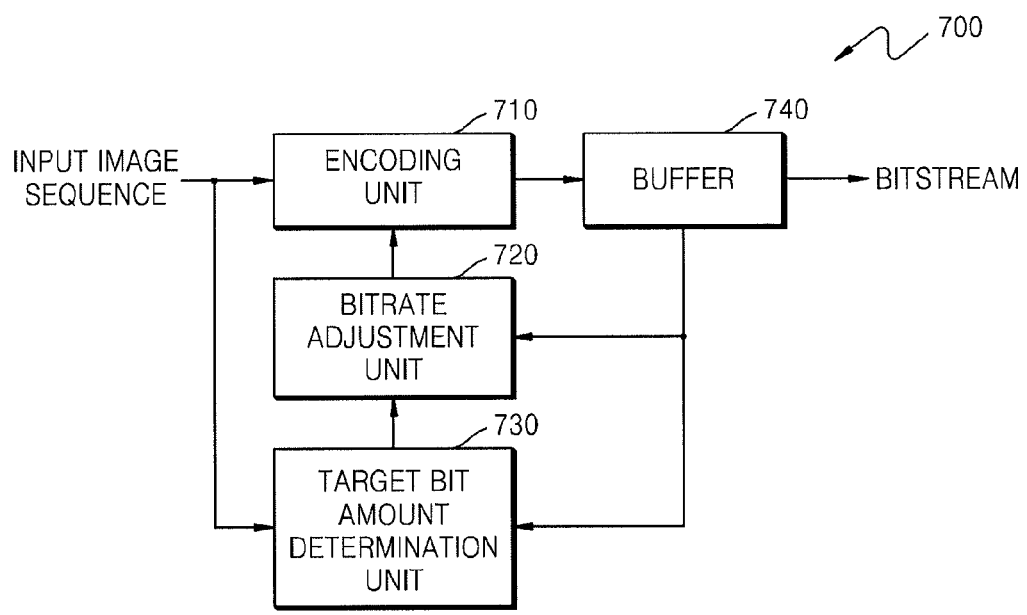
FIG. 7 is a block diagram illustrating a structure of a bitrate control apparatus according to an exemplary embodiment of the present invention.

FIG. 7 is a block diagram illustrating a structure of a bitrate control apparatus 700, according to an exemplary embodiment of the present invention.

Referring to FIG. 7, the bitrate control apparatus 700 according to an exemplary embodiment of the present invention includes an encoding unit 710, a bitrate adjustment unit 720, a target bit amount determination unit 730, and a buffer 740.

When an input video sequence formed only with intra pictures is input, the target bit amount determination unit 730 divides the intra pictures into picture group units, slice units, and macroblock units, and determines a target bit amount for each of the picture group units, the slice units, and the macroblock units.

Figure 8:
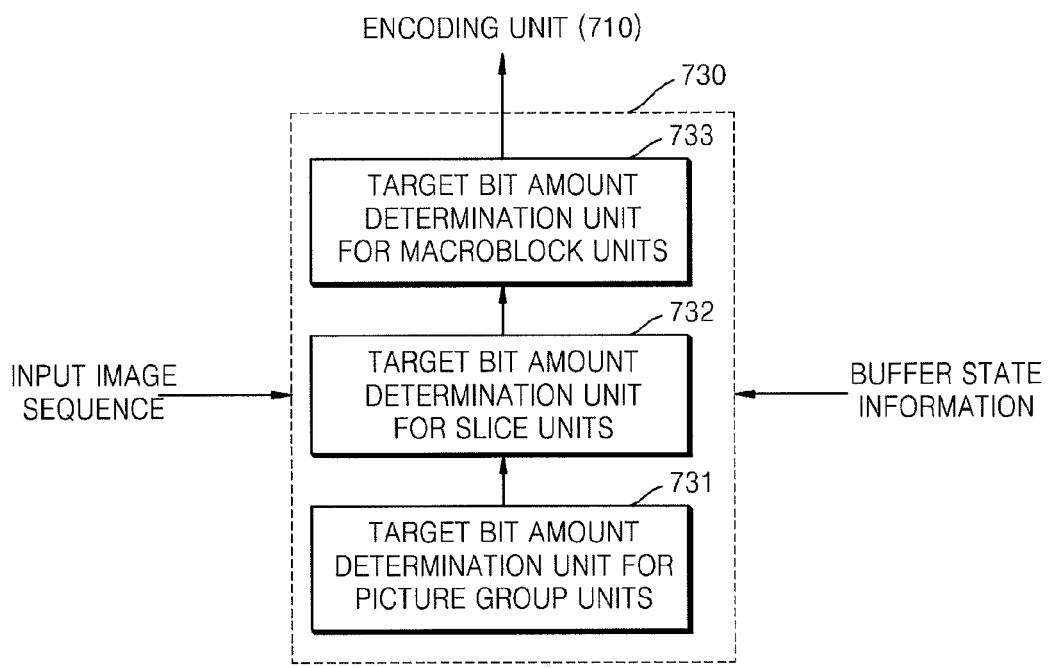
FIG. 8 is a block diagram illustrating a structure of a target bit amount determination unit of the apparatus illustrated in FIG. 7, according to an exemplary embodiment of the present invention.

FIG. 8 is a block diagram illustrating a structure of the target bit amount determination unit 730 of the bitrate control apparatus 700 illustrated in FIG. 7, according to an exemplary embodiment of the present invention.

Referring to FIG. 8, the target bit amount determination unit 730 according to an exemplary embodiment of the present invention includes a target bit amount determination unit 731 for picture group units, a target bit amount determination unit 732 for slice units, and a target bit amount determination unit 733 for macroblock units.

The target bit amount determination unit 731 for picture group units divides intra pictures included in the input video sequence into predetermined picture groups, and determines a target bit amount for each of the picture groups.

The target bit amount determination unit 732 for slice units divides intra pictures included in each picture group into slice units, and determines a target bit amount of each of the slices, based on the target bit amount of a picture group to which the slice belongs.

The target bit amount determination unit 733 for macroblock units determines a target bit amount of a macroblock included in the slice based on the target bit amount of the slice.

Referring again to FIG. 7, the bitrate adjustment unit 720 determines a quantization parameter for encoding a current macroblock, by considering buffer fullness, a target bit amount for a macroblock unit, and the bit amount occurring to the previous macroblock. Also, the bitrate adjustment unit 720 generates a calibration value of a quantization parameter by considering the sate of the buffer 740, i.e., the buffer fullness, and by adding the generated calibration value and the quantization parameter, the bitrate adjustment unit 720 generates and outputs a calibrated quantization parameter.

The encoding unit 710 quantizes the current macroblock based on the calibrated quantization parameter, thereby generating a bitstream. The generated bitstream is stored in the buffer 740, and then, output.

According to the present invention as described by the exemplary embodiments above, when a video sequence formed only with intra pictures is encoded, a predetermined amount of bits are generated in units of macroblocks, thereby preventing occurrence of an overflow and underflow of a buffer storing a bitstream. Furthermore, according to the present invention, a bitrate occurring when a video sequence formed only with intra pictures is encoded is maintained to be uniform, and therefore the present invention can be applied to a system for transmitting high-quality moving pictures in real-time.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of exemplary embodiments of the invention but by the appended claims, and all differences within the scope will be construed as being included in the present invention.

What is claimed is:

1. A method of controlling a bitrate when a video sequence formed only with intra pictures is encoded, the method comprising:

dividing the intra pictures into a plurality of picture groups, and determining target bit amounts of the plurality of picture groups;

dividing intra pictures included in a first picture group into a plurality of slices, and determining target bit amounts of the plurality of slices based on a target bit amount of the first picture group;

determining a target bit amount of a first macroblock included in a first slice of the plurality of slices based on a target bit amount of the first slice; and calculating a quantization parameter of a current macroblock to be encoded, by considering the determined target bit amount of the first macroblock, a generated bit amount allocated to a previous macroblock, and buffer fullness.

2. The method of claim 1, wherein the dividing of the intra pictures into the plurality of picture groups comprises, if the plurality of intra pictures are common mode intra pictures in which the plurality of intra pictures comprise images of a plurality of color components, dividing the plurality of intra pictures so that each of the plurality of picture groups comprises an identical number of intra pictures.

3. The method of claim 1, wherein the dividing of the intra pictures into the plurality of picture groups comprises, if the plurality of intra pictures are common mode intra pictures in which intra pictures comprise images of a plurality of color components, dividing the plurality of intra pictures with reference to an intra picture in which a scene changes.

4. The method of claim 1, wherein the dividing of the plurality of intra pictures into the plurality of picture groups comprises, if the plurality of intra pictures are independent mode intra pictures in which the plurality of intra pictures comprise images of only one corresponding color component among a plurality of color components, dividing the plurality of intra pictures so that a number of intra pictures having a first color component image in a first picture group is the same as a number of intra pictures having a second color component image in a second picture group.

5. The method of claim 1, wherein the dividing of the plurality of intra pictures into the picture groups comprises, if the plurality of intra pictures are independent mode intra pictures in which the plurality of intra pictures comprise images of only one corresponding color component among a plurality of color components, dividing the plurality of intra pictures so that one picture group comprises intra pictures of images of only one color component selected from the plurality of color component images.

6. The method of claim 1, wherein the determining of the target bit amounts of the plurality of picture groups comprises determining a target bit amount RGOP(i) of an i-th picture group to which a macroblock being currently encoded belongs using the following equation:

$$R_{GOP}(i) = R_{GOP}(i-1) + k * \frac{\text{bit\_rate}}{\text{picture\_rate}}$$

where $R_{GOP}(i)$ is the target bit amount of the i-th picture group (i≧0) to which the macroblock being currently encoded belongs, $R_{GOP}(i-1)$ is a target bit amount allocated to an (i−1)-th picture group previous to the current i-th picture group, $R_{GOP}(-1)=0$, k is a total number of intra pictures included in the i-th picture group, bit_rate is an amount of bits which are generated per second, and picture_rate is a number of intra pictures which are generated per second.

7. The method of claim 1, wherein the determining of the target bit amounts of the plurality of slices comprises,
determining a bit amount allocated to a current slice using the following equation:

$$T_{slice}(i, j) = \max\left(T_{slice}^{min}, \frac{R_{GOP}(i, j)}{N_{Slice}(i, j)}\right)$$

where $R_{GOP}(i,j)$ is an amount of bits that can be used from among a bit amount allocated to an i-th picture group at a time when a j-th slice is encoded, $N_{Slice}(i,j)$ is a number of slices that are not encoded in the i-th picture group when the j-th slice of the i-th picture group is encoded, $T_{Slice}^{min}$ is a minimum value of a bit amount that should be allocated to a slice, and $T_{slice}(i,j)$ is an amount of bits allocated to the current slice corresponding to the j-th slice of the i-th picture group.

8. The method of claim 1, wherein the determining of the target bit amount of the first macroblock comprises determining the target bit amount of the current macroblock using the following equation:

$$T_{MB}(i, j) = \frac{T_{Slice}(i, j)}{n_{Slice}}$$

where $T_{MB}(i,j)$ is a target bit amount for the current macroblock at a j-th slice of an i-th picture group, and $n_{Slice}$ is a number of macroblocks included in the j-th slice.

9. The method of claim 1, wherein the determining of the quantization parameter of the current macroblock comprises:
calculating the quantization parameter for encoding the current macroblock, by considering buffer fullness, the target bit amount for the first macroblock unit, and the bit amount allocated to the previous macroblock;
comparing the buffer fullness with a reference value, and according to a magnitude of the buffer fullness, determining whether or not an overflow or underflow of a buffer occurs, and generating a calibration value for calibrating the quantization parameter; and by adding the calibration value to the calculated quantization parameter, calculating a calibrated quantization parameter.

10. The method of claim 1, further comprising, if encoding of all macroblocks included in the first slice is completed, updating values of variables related to bitrate control in order to encode a second slice of the plurality of slices.

11. An apparatus for controlling a bitrate when a video sequence formed only with intra pictures is encoded, the apparatus comprising:
a buffer that temporarily stores an encoded bitstream;
a target bit amount determination unit for picture group units that divides the intra pictures into a plurality of picture groups, and determines target bit amounts of the plurality of picture groups;
a target bit amount determination unit for slice units that divides intra pictures included in a first picture group into a plurality of slices, and determines target bit amounts of the plurality of slices based on a target bit amount of the first picture group;
a target bit amount determination unit for macroblock units that determines a target bit amount of a first macroblock included in a first slice of the plurality of slices based on the target bit amount of the first slice;
a bitrate adjustment unit that determines a quantization parameter for encoding a current macroblock, by considering a buffer fullness, the determined target bit amount for the first macroblock unit, and a bit amount generated for a previous macroblock, and by comparing a magnitude of the buffer fullness with a reference value at a time when the current macroblock is encoded, generating a calibration value according to the buffer fullness, and by adding the generated calibration value to the quantization parameter, generating and outputting a calibrated quantization parameter; and
an encoding unit that quantizes the current macroblock based on the calibrated quantization parameter and generates a bitstream.

12. The apparatus of claim 11, wherein, if the plurality of intra pictures are common mode intra pictures in which the plurality of intra picture comprises images of a plurality of color components, the target bit amount determination unit for picture group units divides the plurality of intra pictures so that each of the plurality of picture groups comprises an identical number of intra pictures.

13. The apparatus claim 11, wherein, if the plurality of intra pictures are common mode intra pictures in which the plurality of intra pictures comprises images of a plurality of color components, the target bit amount determination unit for picture group units divides the plurality of intra pictures with reference to an intra picture in which a scene changes.

14. The apparatus of claim 11, wherein, if the plurality of intra pictures are independent mode intra pictures in which the plurality of intra pictures comprises images of only one corresponding color component among a plurality of color components, the target bit amount determination unit for picture group units divides the plurality of intra pictures so that a number of intra pictures having a first color component image in a first picture group is the same as a number of intra pictures having a second color component image in a second picture group.

15. The apparatus of claim 11, wherein, if the plurality of intra pictures are independent mode intra pictures in which the plurality of intra pictures comprises images of only one corresponding color component among a plurality of color components, the target bit amount determination unit for picture group units divides the plurality of intra pictures so that one picture group comprises intra pictures of images of only one color component selected from the plurality of color component images.

16. The apparatus of claim 11, wherein the target bit amount determination unit for picture group units determines a target bit amount $R_{GOP}(i)$ of an i-th picture group to which a macroblock being currently encoded belongs using the following equation:

$$R_{GOP}(i) = R_{GOP}(i-1) + k * \frac{\text{bit\_rate}}{\text{picture\_rate}}$$

where $R_{GOP}(i)$ is the target bit amount of the i-th picture group ($i \geq 0$) to which the macroblock being currently encoded belongs, $R_{GOP}(i-1)$ is a target bit amount allocated to an (i−1)-th picture group previous to the current i-th picture group, $R_{GOP}(-1)=0$, k is a total number of intra pictures included in the i-th picture group, bit_rate is an amount of bits which are generated per second, and picture_rate is a number of intra pictures which are generated per second.

17. The apparatus of claim 11, wherein the target bit amount determination unit for slice units determines a bit amount allocated to a current slice using the following equation:

$$T_{slice}(i, j) = \max\left(T_{slice}^{min}, \frac{R_{GOP}(i, j)}{N_{Slice}(i, j)}\right)$$

where $R_{GOP}(i,j)$ is an amount of bits that can be used from among a bit amount allocated to an i-th picture group at a time when a j-th slice is encoded, $N_{Slice}(i,j)$ is a number of slices that are not encoded in the i-th picture group when the j-th slice of the i-th picture group is encoded, $T_{Slice}^{min}$ is a minimum value of a bit amount that should be allocated to a slice, and $T_{slice}(i,j)$ is an amount of bits allocated to the current slice corresponding to the j-th slice of the i-th picture group.

18. The apparatus of claim 11, wherein the target bit amount determination unit for macroblock units determines the target bit amount of the current macroblock using the following equation:

$$T_{MB}(i, j) = \frac{T_{Slice}(i, j)}{n_{Slice}}$$

where $T_{MB}(i,j)$ is a target bit amount for the current macroblock at a j-th slice of an i-th picture group, and $n_{Slice}$ is a number of macroblocks included in the j-th slice.

* * * * *